United States Patent [19]
Kimbara

[11] Patent Number: 4,707,584
[45] Date of Patent: Nov. 17, 1987

[54] DUAL-POLARIZATION, DUAL-FREQUENCY CUTTING MACHINE

[75] Inventor: Yoshihide Kimbara, Aichi, Japan

[73] Assignee: Mitsubishi Denki Kabushiki Kaisha, Tokyo, Japan

[21] Appl. No.: 941,138

[22] Filed: Dec. 12, 1986

[30] Foreign Application Priority Data

Dec. 12, 1985 [JP] Japan ................................ 60-279822

[51] Int. Cl.$^4$ ............................................. B23K 26/00
[52] U.S. Cl. ........................ 219/121 LG; 219/121 LN; 219/121 LQ; 219/121 LS; 273/27; 350/174; 350/403
[58] Field of Search ................. 219/121 LG, 121 LN, 219/121 LS, 121 LR, 121 LQ; 350/174, 401, 403; 372/8, 12, 27

[56] References Cited

U.S. PATENT DOCUMENTS 3,229,095 1/1966 Lasher et al. ................ 219/121 LS
4,336,439 6/1982 Sagnett et al. ............... 219/121 LG

OTHER PUBLICATIONS

Sincerbox, *IBM Technical Disclosure Bulletin* "Laser Beam Combining", vol. 12, No. 10, Mar. 1970, pp. 1663, 1664.

Primary Examiner—C. L. Albritton
Attorney, Agent, or Firm—Sughrue, Mion, Zinn, Macpeak, and Seas

[57] ABSTRACT

A laser beam device for cutting a workpiece in which two circularly polarized beams of opposite polarizations and of slightly different frequencies are combined into the cutting beam.

6 Claims, 18 Drawing Figures

FIG. 1 PRIOR ART
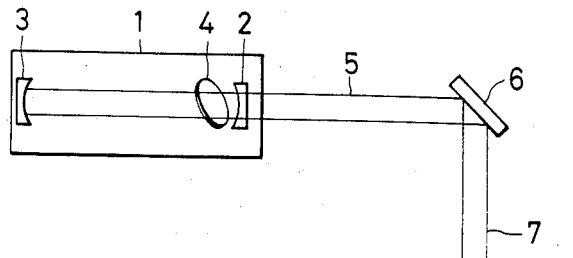
FIG. 2(a)  FIG. 2(b)
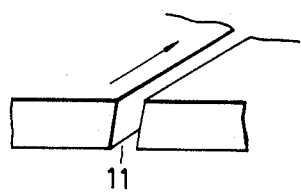 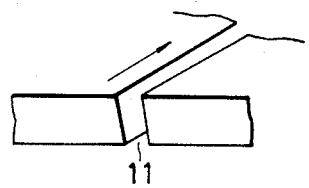 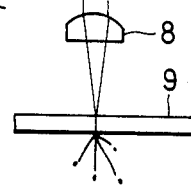
FIG. 3(a)  FIG. 3(b)
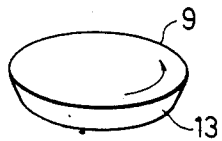 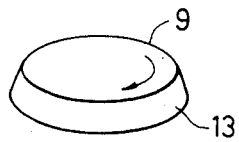
FIG. 3(c)  FIG. 3(d)
 

FIG. 6
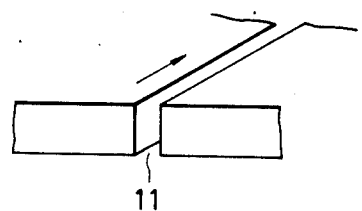
FIG. 7(a)    FIG. 7(b)
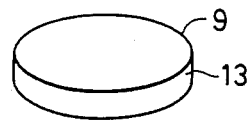  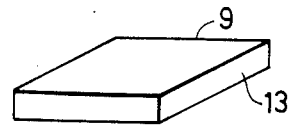

DUAL-POLARIZATION, DUAL-FREQUENCY CUTTING MACHINE

BACKGROUND OF THE INVENTION

Field of the Invention

This invention relate to the polarization of a laser beam utilized for cutting a workpiece in a laser beam machine.

BACKGROUND OF THE INVENTION

FIG. 1 shows the arrangement of a conventional laser beam machine. In FIG. 5, a laser oscillator 1 comprises a partial transmission mirror 2 and a total reflection mirror 3 at opposite ends of a laser medium (not shown) and an exciting means (not shown) for exciting the laser medium. The laser oscillator 1 outputs a linearly polarized laser beam 5 through a polarizing element such as Brewster window 4. Further shown in FIG. 5 is a phase retardation mirror 6 (hereinafter referred to as "a retarder 6"). The retarder 6 acts as a quarter-wave plate, to convert the linearly polarized laser beam 5 into a circularly polarized laser beam 7.

When the retarder 6 acts as a wave plate having a phase difference of $-90°$, the circularly polarized laser beam 7 is polarized in the counterclockwise direction. When the retarder 6 acts as a wave plate having a phase difference of $-270°$ or $+90°$, the laser beam 7 is polarized in the clockwise direction.

The circularly polarized laser beam 7 is focused with a lens 8, and a workpiece 9 to be machined is placed near the focal point of the lens 8. Under this condition, the workpiece 9 is moved together with the lens 8 by a NC (numerical control) machine (not shown) or the like, to cut the workpiece to a desired configuration with high accuracy.

The inventor has found that, in the case of cutting a workpiece 9 of metal such as iron or stainless steel, even if a completely circularly polarized laser beam is employed, the cutting slit is inclined. The inclination of the cutting slit formed by the circularly polarized laser beam which is directed counterclockwise (hereinafter referred to as "a counterclockwise polarized laser beam") is opposite in direction to that of the cutting slit formed by the circularly polarized laser beam which is directed clockwise (hereinafter referred to as "a clockwise polarized laser beam"). More specifically, in the case where a counterclockwise polarized laser beam is employed, the cutting slit 11 is inclined to the left as shown in of FIG. 2(a) (the cutting direction being indicated by the arrow). In the case where a clockwise polarized laser beam is employed, the cutting slit 11 is inclined to the right as shown in FIG. 2(b). FIGS. 3(a) through 3(d) show the configurations of workpiece 9 which have been machined with a counterclockwise polarized laser beam. As is apparent from FIGS. 3(a)-3(d), when the workpiece 9 is cut in the direction of the arrow, the cutting surface 13 is inclined as shown. The inclination is 0.3 to 0.4 degree. Therefore, in the case where the workpiece is an iron plate 2 mm in thickness, the cutting line on one side of the workpiece 9 is shifted 20 to 30 micrometers from that on the other side. In general, the accuracy of an NC machine is of the order of 1 to 5 micrometers. Therefore, the machining accuracy of the workpiece is lowered by the above-described inclination of the cutting surface 13. That is, even if the completely circularly polarized laser beam 7 is employed, the cutting surface of the workpiece 9 is inclined, and the machining accuracy is thereby decreased.

SUMMARY OF THE INVENTION

Accordingly, an object of this invention is to eliminate the above-described difficulty accompanying a conventional laser beam machine. More specifically, an object of the invention is to provide a laser beam machine which can cut a workpiece perpendicularly.

In a laser beam machine according to the invention, a counterclockwise polarized laser beam and a clockwise polarized laser beam which are different in frequency from each other are combined into one laser beam, and the combined laser beam is focused with a lens to cut a workpiece.

In the laser beam machine of the invention, the counterclockwise polarized laser beam and the clockwise polarized laser beam which are different in frequency from each other are combined into one laser beam as was described above. Thereby the laser beams interfere with each other and, owing to the frequency difference therebetween, the counterclockwise polarized laser beam and the clockwise polarized laser beam act on the workpiece alternately, to form a perpendicular cutting slit in the workpiece.

BRIEF DESCRIPTION OF THE DRAWINGS

FIG. 1 is an explanatory diagram showing the arrangement of a conventional laser beam machine.

FIGS. 2(a) and 2(b) are explanatory diagrams showing the cutting slits which are formed in workpieces by the conventional laser beam machine.

FIGS. 3(a) through 3(d) are explanatory diagrams showing the cutting surfaces of products different in configuration which are formed by cutting workpieces with the conventional laser beam machine.

FIG. 6 is an explanatory diagram showing the cutting slit which is formed in a workpiece with the laser beam machine.

FIGS. 7(a) and 7(b) are explanatory diagrams showing the cutting surfaces of workpieces different in configuration.

DETAILED DESCRIPTION OF THE PREFERRED EMBODIMENTS

Figure 4:
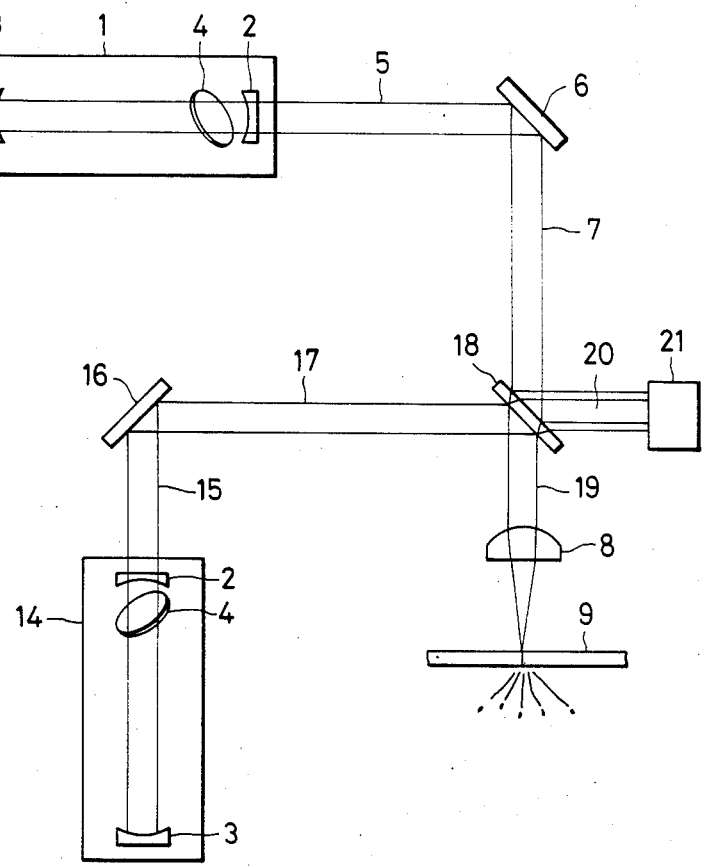
FIG. 4 is an explanatory diagram showing the arrangement of a laser beam machine which is one embodiment of this invention.

One embodiment of this invention will be described with reference to the accompanying drawings. In FIG. 4, reference numerals 1 through 9 designate the same components or parts that are shown in FIG. 1. The retarder 6 is set to have a phase difference of $-90°$ so that the laser beam 7 is polarized in the counterclockwise direction. This embodiment includes a second laser oscillator 14. In the oscillator 14, a cavity length defined by the partial transmission mirror 2 and the total reflection mirror 3 is changed with respect to the first laser oscillator 1, in order to output a linearly polarized laser beam 15 different in frequency. A retarder 16 acts as a wave plate having a phase difference of $+90°$ or $-270°$ to convert the linearly polarized laser beam 15 into a clockwise polarized laser beam 17. A beam splitter 18 operates to combine the counterclockwise polarized laser beam 7 outputted by the first oscillator 1 and the clockwise polarized laser beam 17 outputted by the second oscillator 14 into one laser beam 19. The beam 19 thus provided is focused by the lens 8 to cut the workpiece 9 near the focal point.

The reflected laser beam resulting from the counterclockwise polarized laser beam 7 and the transmitted laser beam resulting from the clockwise polarized laser beam 17 are also combined into a laser beam 20 by the laser splitter 18. However, since the composite laser beam 20 is unnecessary for the cutting operation, it is absorbed by a damper 21.

The circular polarization and the vector of the laser beam will be described.

Figures 5A, 5C, 5E:
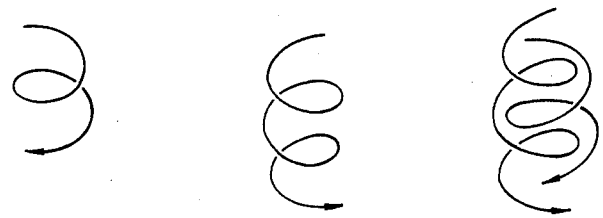
FIGS. 5(a) through 5(g) are explanatory diagrams for a description of the circular polarization and the vector of a laser beam in the laser beam machine according to the invention.
Figures 5B, 5D, 5F:
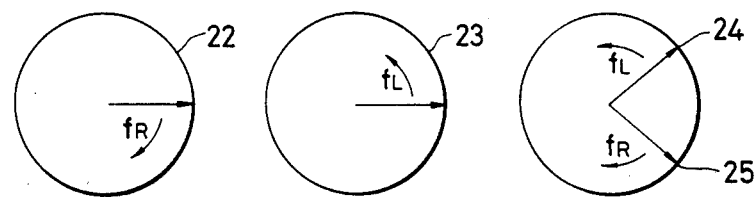
Figure 5G:
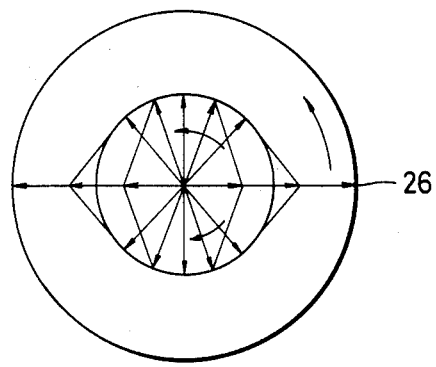

FIG. 5(a) shows a clockwise polarized laser beam, and an electric or magnetic vector 22 turns clockwise at a frequency of $f_R$ as indicated by the arrow in FIG. 5(b). FIG. 5(c) shows a counterclockwise polarized laser beam, and a corresponding vector 23 turns counterclockwise at a frequency of $f_L$ as indicated by the arrow of FIG. 5(d). FIG. 5(e) shows the composite of the clockwise polarized laser beam shown in FIG. 5(a) and the counterclockwise polarized laser beam shown in the FIG. 5(c). It can be considered that, in this case, a vector 24 turns counterclockwise at the frequency of $f_L$ while a vector 25 turns clockwise at the frequency of $f_R$, as indicated in FIG. 5(f). FIG. 5(g) shows a composite vector 26 of the vectors 24 and 25, each of which turns as shown in FIG. 5(f). If the frequency $f_L$ is equal to the frequency $f_R$, then the composite vector 26 acts as a linearly polarized laser beam having the magnitude which is the sum of the vectors 24 and 25. In the case where the counter clockwise frequency $f_L$ is different from the clockwise frequency $f_R$, for instance the counter clockwise frequency $f_L$ is higher by f than the clockwise frequency $f_R$, the composite vector 26 turns counterclockwise. That is, it turns with the difference frequency f' between the frequencies $f_L$ and $f_R$.

For instance, a $CO_2$ laser has a frequency of $28 \times 10^{12}$ $H_z$. Assume that the cavity length of the laser oscillator, which is defined by the partial transmission mirror is 2 and the total reflection mirror 3, is 2 m. Therefore, if the cavity length is changed by one-tenth of the wavelength i.e., 1 micrometer, then the frequency change is of the order of $60 \times 10^6$ MHz. Furthermore, as to $CO_2$ laser can oscillate with a wavelength of as little as 9.6 micrometers, the frequency difference can be of the order of $3.0 \times 10^{12}$ Hz with respect to the central wavelength of 10.6 micrometers which is usually employed.

When the laser oscillators different in oscillation frequency as described above are employed as the first and second laser oscillators 1 and 14 arranged as shown in FIG. 1, the composite laser beam 19 is a linearly polarized one. However, its polarization direction turns at a speed f', which is lower than the speed of rotation $f_R$ or $f_L$ of either of the circularly polarized laser beams.

It can be considered that the inclination of the cutting slit in the workpiece 9 is caused by the fact that the direction of the action of the circularly polarized laser beam to the workpiece (which is determined by the direction of rotation, the frequency and the advancing velocity (light velocity) of the circularly polarized laser beam) depends on the angle of the reflectivity of the workpiece 9. Therefore, the inclination of the cutting slit provided by the counterclockwise polarized laser beam is opposite to that of the cutting slit provided by the clockwise polarized laser beam. However, if the above-described composite beam 19 is employed, then the speed of rotation of the composite beam is the frequency difference f'. This rotation is considerably low with respect to the frequencies of the beams which are combined into the composite beam, and can be disregarded.

When the aforementioned cavity length is changed, the speed of rotation becomes $2.1 \times 10^{-22}$ times, and when the wavelength of 9.6 micrometers is utilized, it becomes 0.1 times. Therefore, the action of the composite beam to the inclination of the cutting slit is greatly reduced.

The speed of rotation of the composite beam 19 is considerably high when compared with the cutting operation. Therefore, it can be considered that the composite beam acts uniformly on the workpiece 9. In addition to this, the composite beam 19 is linearly polarized. Accordingly, the cutting slit will not be inclined.

Therefore, when the workpiece is cut with the above-described composite beam, the cutting slit is perpendicular to the workpiece as shown in FIG. 6. Accordingly, when the workpiece is cut as shown in FIG. 7(a) or 7(b), its cutting surface 13 is perpendicular to the workpiece.

As is apparent from the above description, the laser beam machine of the invention is so designed that the counterclockwise polarized laser beam and the clockwise polarized laser beam are combined into one composite laser beam. Therefore, in cutting a workpiece with the laser beam machine, the cutting slit is perpendicular to the workpiece. Thus, the laser beam machine according to the invention is high in machining accuracy.

What is claimed is:

1. A laser beam machine for cutting a workpiece with a laser, comprising:
    a first laser source providing a circularly polarized clockwise laser beam of a first frequency;
    a second laser source providing a circularly polarized counterclockwise laser beam of a second frequency different from said first frequency;
    means for combining said clockwise and counter clockwise beams into a combined beam; and
    means for directing said combined beam along a direction to a workpiece to be cut.

2. A laser beam machine as recited in claim 1, wherein said combined beam is a linearly polarized beam having a polarization vector rotating at a difference frequency between said first and second frequencies.

3. A laser beam machine as recited in claim 1, wherein each of said first and second laser sources includes a $CO_2$ laser.

4. A laser beam machine as recited in claim 3, wherein said first and second frequencies differ by no more than $3.0 \times 10^{12}$ Hz.

5. A laser beam machine as recited in claim 4, wherein said first and second frequencies differ by approximately $60 \times 10^6$ Hz.

6. A method of cutting workpiece, comprising the steps of:
    providing a circularly polarized clockwise laser beam of a first frequency;
    provide a circularly polarized counterclockwise laser beam of a second frequency different from said first frequency;
    combining said clockwise and counterclockwise beams into a combined beam; and
    cutting a workpiece with said combined beam.

* * * * *